US008825377B2

(12) United States Patent
Callaghan et al.

(10) Patent No.: US 8,825,377 B2
(45) Date of Patent: Sep. 2, 2014

(54) MOBILE NAVIGATION TO A MOVING DESTINATION

(71) Applicant: Microsoft Corporation, Redmond, WA (US)

(72) Inventors: David Michael Callaghan, Redmond, WA (US); Sergey Karamov, Redmond, WA (US); Sanjib Saha, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/656,477

(22) Filed: Oct. 19, 2012

(65) Prior Publication Data
US 2014/0114564 A1 Apr. 24, 2014

(51) Int. Cl.
G01C 21/34 (2006.01)
(52) U.S. Cl.
USPC .......................................................... 701/416
(58) Field of Classification Search
USPC .......................................................... 701/416
See application file for complete search history.

(56) References Cited

U.S. PATENT DOCUMENTS

| 6,226,589 | B1 | 5/2001 | Maeda et al. | |
|---|---|---|---|---|
| 6,867,733 | B2 * | 3/2005 | Sandhu et al. | 342/357.34 |
| 7,373,153 | B2 * | 5/2008 | Daurensan | 455/456.1 |
| 7,598,855 | B2 * | 10/2009 | Scalisi et al. | 340/539.13 |
| 8,145,417 | B1 * | 3/2012 | Chitre et al. | 701/400 |
| 2008/0132252 | A1 | 6/2008 | Altman et al. | |
| 2008/0248749 | A1 | 10/2008 | Bahl et al. | |
| 2009/0104919 | A1 | 4/2009 | Heater et al. | |
| 2009/0143079 | A1 * | 6/2009 | Klassen et al. | 455/456.3 |
| 2010/0323715 | A1 | 12/2010 | Winters | |
| 2011/0246606 | A1 | 10/2011 | Barbeau et al. | |
| 2012/0143496 | A1 | 6/2012 | Chitre et al. | |
| 2012/0158845 | A1 | 6/2012 | Baalu et al. | |

FOREIGN PATENT DOCUMENTS

EP 2 019 290 A2 1/2009
EP 2 386 878 A1 11/2011

OTHER PUBLICATIONS

Barbeau et al., "Dynamic Management of Real-Time Location Data on GPS-Enabled Mobile Phones," *In Proceedings of Mobile Ubiquitous Computing, Systems, Services, and Technologies*, Sep. 29, 2008, 6 pp.
International Search Report & Written Opinion for PCT Application No. PCT/US2013/065745, Mailed Date: Feb. 3, 2014, 10 Pages.

* cited by examiner

*Primary Examiner* — Mary Cheung
*Assistant Examiner* — Anne Mazzara
(74) *Attorney, Agent, or Firm* — John Jardine; Andrew Sanders; Micky Minhas

(57) ABSTRACT

A source device can navigate towards a moving destination target device, such as when two mobile phones are moving towards each other. The source device can receive an initial position of the target and a route to the target. As the source device and target device simultaneously move, the route can be updated. For example, if a distance of movement exceeds a threshold (e.g., 1 mile) the route can be updated. In another embodiment, a target device can switch between position tracking devices so as to provide less accurate position information, but save power, or provide high accuracy position information at the cost of higher power consumption. Generally, the switching between position tracking devices and the frequency at which the route to the destination point can be based on the distance apart between the source device and target device.

19 Claims, 6 Drawing Sheets

MOBILE NAVIGATION TO A MOVING DESTINATION

BACKGROUND

The incorporation of location and navigation technology, such as global positioning system (GPS) technology into mobile phones and similar wireless portable devices has created a class of "location-aware" devices that allow users to communicate with other users as well as determine or even view the location of other users on their own device. Such devices may be configured to display a regional map and the location of other users and/or places of interest on their device. However, the technology has been generally limited to navigating to fixed locations. Little has been done to address navigation to another client device that itself is moving.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a source device can navigate towards a moving destination target device. The source device can receive an initial position of the target and a route to the target. As the source device and target device simultaneously move, the route can be updated. For example, if a distance of movement exceeds a threshold (e.g., 1 mile) the route can be updated.

In another embodiment, a target device can switch between position tracking devices so as to provide less accuracy, but save power, or provide high accuracy at the cost of higher power consumption. Generally, the switching between position tracking devices can be based on a distance apart between the source device and target device. When far apart, less accuracy is needed. However, when the devices are near to each other, higher accuracy is desired.

The foregoing and other objects, features, and advantages of the invention will become more apparent from the following detailed description, which proceeds with reference to the accompanying figures.

DETAILED DESCRIPTION

In some embodiments described herein, navigation software can continuously generate a path to a moving target in real time. For example, a target mobile device can automatically monitor its own location and publish location-information updates in real time when its location has changed more than a threshold amount. Mapping software (located on a source device, such as a mobile phone, or a server computer) can receive the real-time updates from the target device and generate new routing directions from the source device to the target device. The target mobile device can include the option to send its Global Positioning System (GPS) coordinates or other position/location information to a server computer or the source device directly. The direct peer-to-peer option of sending directly to the source device can prevent a third-party service from tracking the target device for security reasons. The server-based sharing option can allow multiple source devices to track a target location more efficiently, as the target device only needs to transmit a single position update. Publishing of updates in real time can include sending messages over General Packet Radio Service (GPRS), LTE, WiFi, SMS messages, etc. which can be routed to a real-time mapping application on the source device. Long-running computations on the target device can be kept to a minimum and power-consuming high-accuracy location tracking can be enabled when one of the source devices has moved more than a predetermined distance or when the source device is within a predetermined distance from the target device. Computation related to changed destination on the source devices can be kept to a minimum by having a centrally available server computer acting as a navigation broker to perform complex computations and send destination updates as well as updated routing and navigation related information.

Figure 1:
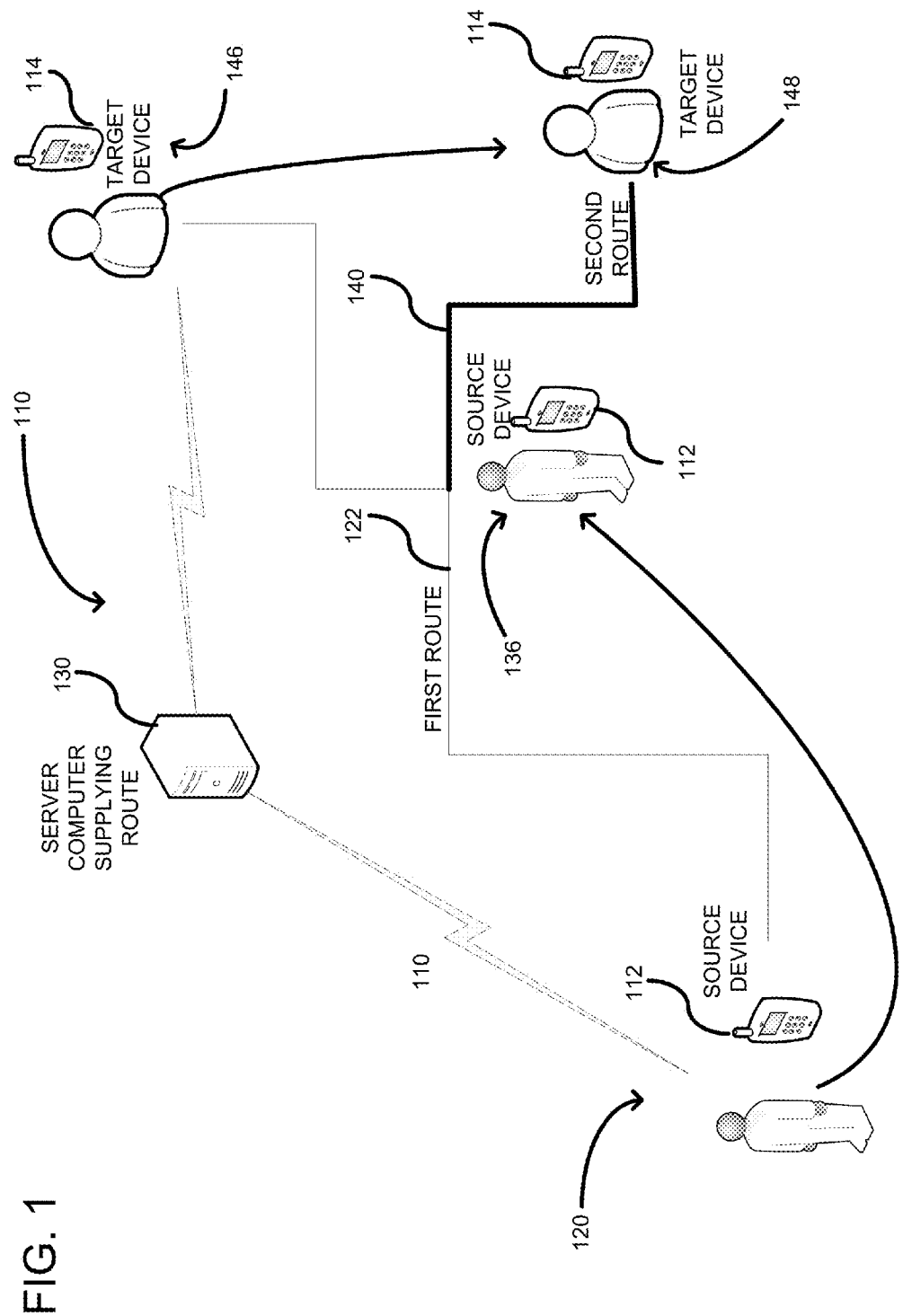
FIG. 1 is a system diagram showing a source device, which is in motion, having updated routing information to a target device, which is also in motion.

FIG. 1 shows an overview system diagram 110. A source mobile device 112, such as a mobile phone, laptop computer, tablet computer, etc., can navigate to a target mobile device 114. The source mobile device 112 can begin at a first position shown at 120 and receive a first route 122 that is typically a map in conjunction with visual road indications to the target device 114. The route can be supplied from a server computer 130, as described further below, or can be calculated on the source device 112 itself. As the source mobile device 112 moves to a second position 136, the server computer can provide an updated second route 140, which can be different than the first route, particularly because the target device moved from position 146 to position 148. The second route 140 is shown in heavier weighted lines than the first route 122 for purposes of clarity. By updating the route, it is meant that the route is recalculated from the current position 136 of the source device 112 to the current position 148 of the target device 114. Some portions of the second route can overlap with the first route, but at least one portion of the route changed due to the new location 148 of the target device 114. The route can be further updated as the source mobile device 112 moves closer to the target mobile device 114. Thus, continuous updates that recalculate the route from the new starting point to a new ending point allow the source device 112, which is changing position, to navigate to the target device 114, which is also simultaneously changing position.

Figure 2:
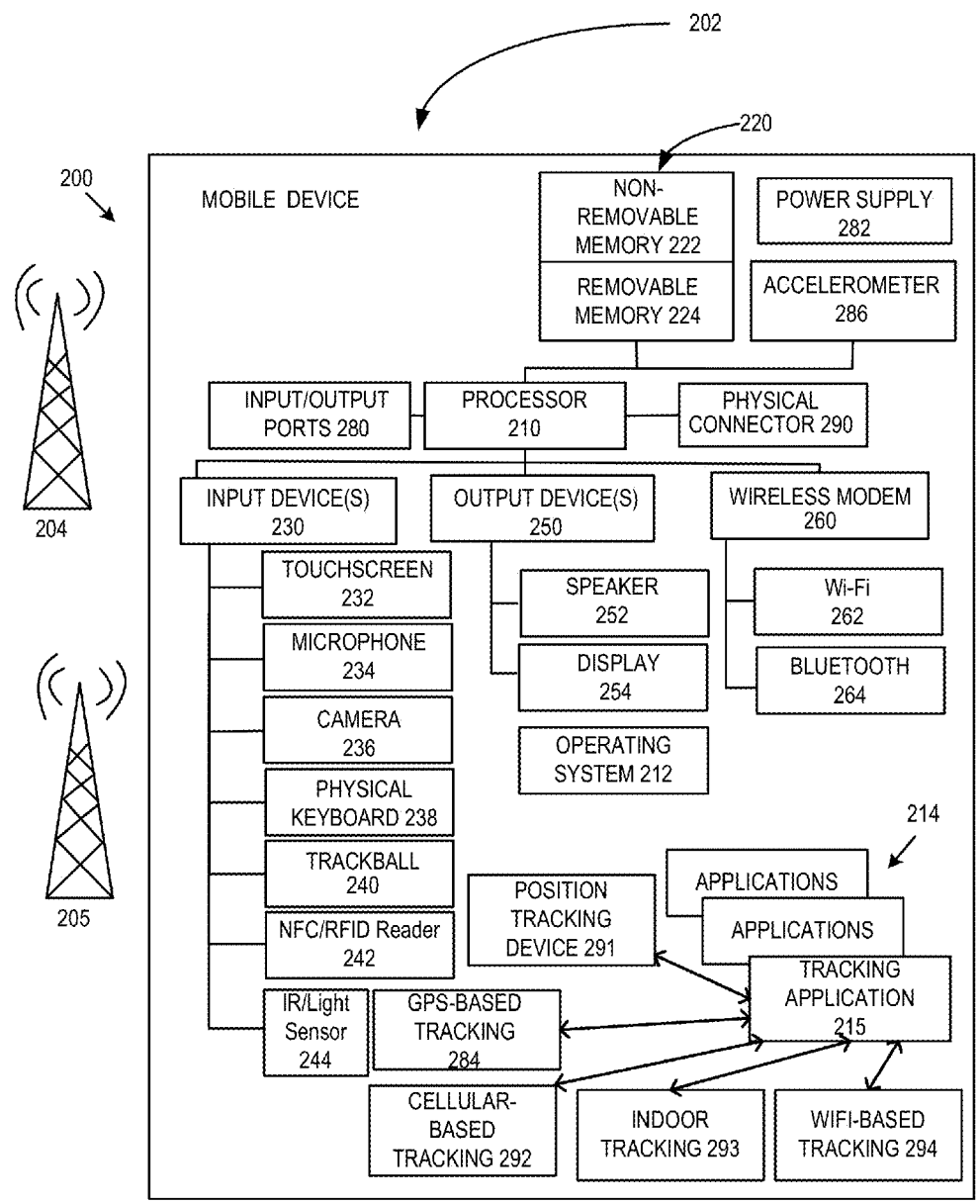
FIG. 2 is an exemplary mobile device that can be used in any of the embodiments described herein.

FIG. 2 is a system diagram depicting an exemplary mobile device 200, which can be used for the source mobile device 112 or the target mobile device 114, including a variety of optional hardware and software components, shown generally at 202. Any components 202 in the mobile device can communicate with any other component, although not all connections are shown, for ease of illustration. The mobile device can be any of a variety of computing devices (e.g., cell phone, smartphone, handheld computer, Personal Digital Assistant (PDA), Tablet, etc.) and can allow wireless two-way communications with one or more mobile communications networks 204, such as a cellular or satellite network.

The illustrated mobile device 200 can include a controller or processor 210 (e.g., signal processor, microprocessor, ASIC, or other control and processing logic circuitry) for performing such tasks as signal coding, data processing, input/output processing, power control, and/or other functions. An operating system 212 can control the allocation and usage of the components 202 and support for one or more application programs 214. The application programs can include common mobile computing applications (e.g., email applications, calendars, contact managers, web browsers, messaging applications), or any other computing application. A tracking application 215 can be used in conjunction with the functionality described in FIG. 1. In particular (and as explained further below), the tracking application 215 can provide a current position for the mobile device 200 using a variety of tracking systems, which typically have different power consumptions and different accuracies. A generic position tracking device 291 is shown to represent any current or later developed tracking device used to obtain the position of the mobile device 200. Other position tracking systems can be used, such as a GPS-based tracking 284, cellular-based tracking 292, and WiFi-based tracking 294. Device 293 represents an indoor tracking mechanism which may rely on ultrasound or RF tags with known positions as well as inertial tracking which counts distance in paces and turns using changes in compass and accelerometer readings. Any of these systems can provide a current position of the mobile device 200. The accuracy and power consumption typically vary across different position tracking systems. Generally, high-accuracy tracking system, such as a GPS-based tracking 284, consume significantly more power compared to a low-accuracy position tracking system, such as cellular-based tracking 292. Additionally position tracking system have attributes such as ability to function indoors vs. outdoors and resolution which are better suited to track position based upon the location and speed traveling. As described further below, while publishing an updated position, the tracking application 215 can switch between tracking devices by receiving an external command from a server or source device that dictates a degree of desired accuracy. More accuracy typically requires more power. Thus, the tracking application 215 can use lower power tracking devices until receiving the external command for high accuracy and then switch the tracking device used.

The illustrated mobile device 200 can include memory 220. Memory 220 can include non-removable memory 222 and/or removable memory 224. The non-removable memory 222 can include RAM, ROM, flash memory, a hard disk, or other well-known memory storage technologies. The removable memory 224 can include flash memory or a Subscriber Identity Module (SIM) card, which is well known in GSM communication systems, or other well-known memory storage technologies, such as "smart cards." The memory 220 can be used for storing data and/or code for running the operating system 212 and the applications 214. Example data can include web pages, text, images, sound files, video data, or other data sets to be sent to and/or received from one or more network servers or other devices via one or more wired or wireless networks. The memory 220 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 200 can support one or more input devices 230, such as a touchscreen 232, microphone 234, camera 236, physical keyboard 238 and/or trackball 240, near field communications interface (NFC) and/or RFID reader 242, light sensor 244, and one or more output devices 250, such as a speaker 252 and a display 254. Other possible output devices (not shown) can include piezoelectric or other haptic output devices. Some devices can serve more than one input/output function. For example, touchscreen 232 and display 254 can be combined in a single input/output device. The NFC and RFID reader can detect location by receiving an input which can be looked up to provide a fixed location. The IR/Light sensor device 244 can be used to receive infra-red (IR) or other light signals beacons signal shown as device 205. These beacon signals can contain the fixed location or their identity can be used as a look up into a table of known fixed locations using an application such as device 214. The location is course corrected when a user walks under a beacon transmitting the fixed location indoors or the RFID/NFC proximity is detected. The input devices 230 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 212 or applications 214 can comprise speech-recognition software as part of a voice user interface that allows a user to operate the device 200 via voice commands. Further, the device 200 can comprise input devices and software that allows for user interaction via a user's spatial gestures, such as detecting and interpreting gestures to provide input to a gaming application.

A wireless modem 260 can be coupled to an antenna (not shown) and can support two-way communications between the processor 210 and external devices, as is well understood in the art. The modem 260 is shown generically and can include a cellular modem for communicating with the mobile communication network 204 and/or other radio-based modems (e.g., Bluetooth 264 or WiFi 262). The wireless modem 260 is typically configured for communication with one or more cellular networks, such as a GSM network for data and voice communications within a single cellular network, between cellular networks, or between the mobile device and a public switched telephone network (PSTN).

The mobile device can further include at least one input/output port 280, a power supply 282, an accelerometer 286, and/or a physical connector 290, which can be a USB port, IEEE 1394 (FireWire) port, and/or RS-232 port. The illustrated components 202 are not required or all-inclusive, as any components can be deleted and other components can be added.

Figure 3:
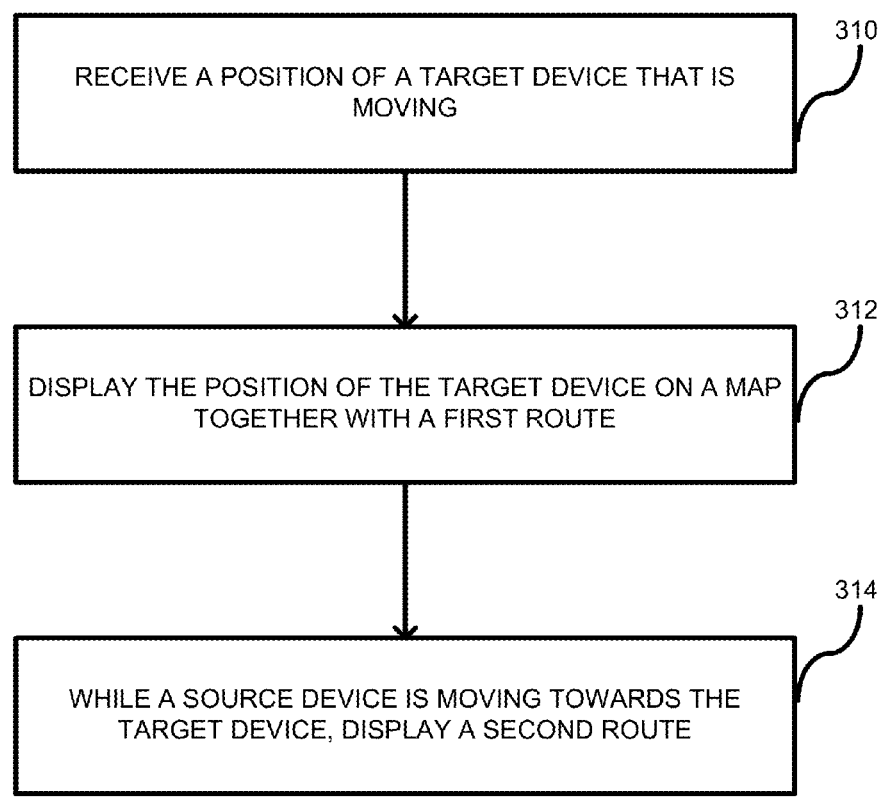
FIG. 3 is a flowchart of a method for navigating to a target device that is itself moving.

FIG. 3 provides a flowchart of a method for navigating from a source device to a target device. In process block 310, a target device position is received, such as on a source device that is navigating to the target device. The target device can be in the process of changing positions, such as a user of a mobile device driving or walking to a new location. In process block 312, the source device displays the position of the target device on a map together with a first route. The route can be calculated by the source device itself or provided to the source device by an intermediate server computer. In process block 314, the source device displays an updated (changed) second route, different than the first route, due to the changing positions of the source and/or target devices.

Figure 4:
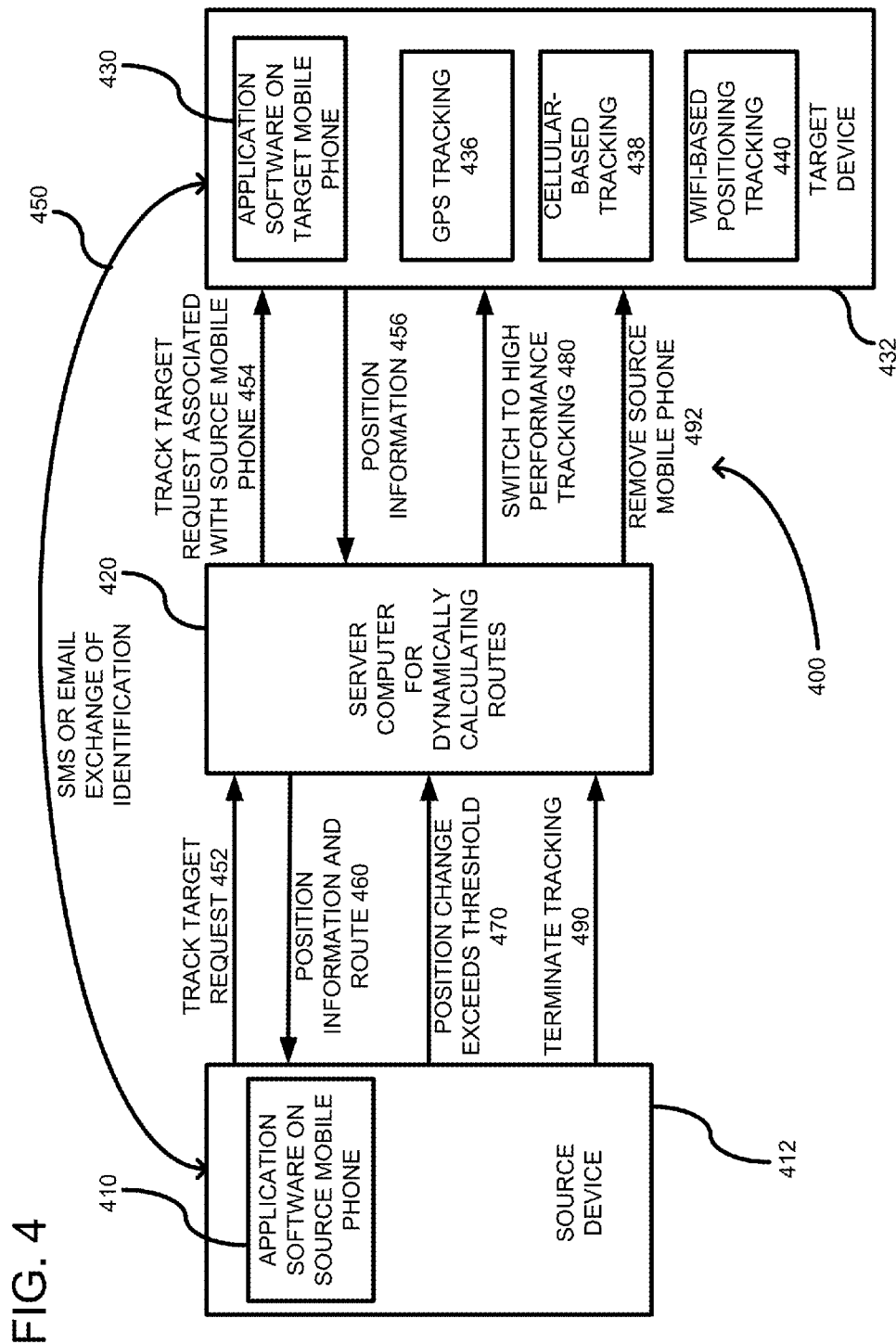
FIG. 4 is an embodiment of a system having a source mobile phone, target mobile phone and a server computer for dynamically calculating routes so that the source mobile phone can navigate to the target mobile phone.

FIG. 4 shows a system 400 that can be used to navigate to a moving client device, which will be described as a mobile phone, although other devices can be used as already described above. Application software 410 can be executing on the source mobile phone 412 and can communicate via a network (e.g. the Internet) with a server computer 420. The server computer is positioned intermediate the application software 410 on the source mobile phone and application software 430 executing on a target mobile phone 432. The target mobile phone 432 has a plurality of position tracking devices located thereon including a GPS tracking system 436, a cellular-based tracking system 438, and a WiFi-based tracking system 440. It will be appreciated that the target application software 430 and the position tracking devices can also be located on the source mobile phone 412 so that the two phones 412, 432 are simultaneously tracking each other. During an initialization phase, shown at 450, an SMS or email communication between the source mobile phone 412 and target mobile phone 432 can be used to receive an identification tag (e.g., GUID, phone number, etc.) of the target mobile phone which may or may be not be used by external entities to identify the personal identity of the person being tracked. For example the identity may be a permanent tag, or a temporary tag which is discarded. The application software 410 on the source mobile phone 412 can send a track target request 452 in response to user input that includes the identification of the target mobile phone. The track target request 452 can also include position information of the source device 412. The server computer 420 can receive the request 452 and send a track target request 454 to the target mobile phone 432. In response, the target mobile phone can obtain its current position information using the cellular-based tracking 438 (using cell towers for tracking) or WiFi-based tracking 440 (using WiFi access points for tracking), whichever is available. Other tracking devices can also be used. However, the target device 432 can enter an initial phase in which a low-power tracking device is used, as opposed to the GPS tracking 436, which can use more power. Once the application software 430 on the target device 432 receives the current position from the position tracking device, the position information 456 is published to the server computer 420. The position information 456 of the target device can be used in conjunction with the received position of the source device to calculate a first route from the source device 412 to the target device 432. The target position and route 460 can be passed to the source device 412. The application software 410 can save its current position at the time of the track target request 452 and compare its updated position to the saved position. Once a certain threshold distance is surpassed from the saved position, a position change command 470 can be sent to the server computer 420 including the new position of the source device 412. In response, the server computer 420 can request an updated position from the target device, calculate a new route from the source to target device, and pass the position information and new route to the source device. At some point, the source device 412 and target device 432 will be close enough together (less than a threshold distance) that can trigger the server computer to send a switch tracking device command 480. The application software 430 can then switch to high-accuracy mode by using GPS tracking 436. Thus, upon request from the server computer, the application software 430 can switch tracking devices to a high-accuracy device, obtain its position coordinates using the high-accuracy device and publish the coordinates to the server computer 420. The server computer can then inform the application software 410 of the updated target position and the final route, if it changed, to the target device. As the target device 432 moves, the application software 430 on the target device can continue to obtain new position coordinates and publish the same to the server computer 420, so that the final route to the target can be recomputed periodically and the new final route, if it changed, can be informed to the application software 410 on the source device 412. Once the source device is finished navigating to the target device and no longer needs to track the target device anymore, a terminate tracking command 490 can be transmitted to the server computer 420. In response, the server computer can send the remove source mobile phone command 492, which will result in the application software 430 stopping the position tracking operation and erasing any saved source device information.

Although a server computer 420 is described intermediate the source device 412 and the target device 432, the server computer can be removed and the commands described herein can be sent directly between the source device and target device, such as by using peer-to-peer communication, for example.

It should be appreciated that a user can at any time opt-in consent or op-out of having the tracking data collected. The target device generally controls its own position information and pushes the information to the server or source device.

Figure 5:
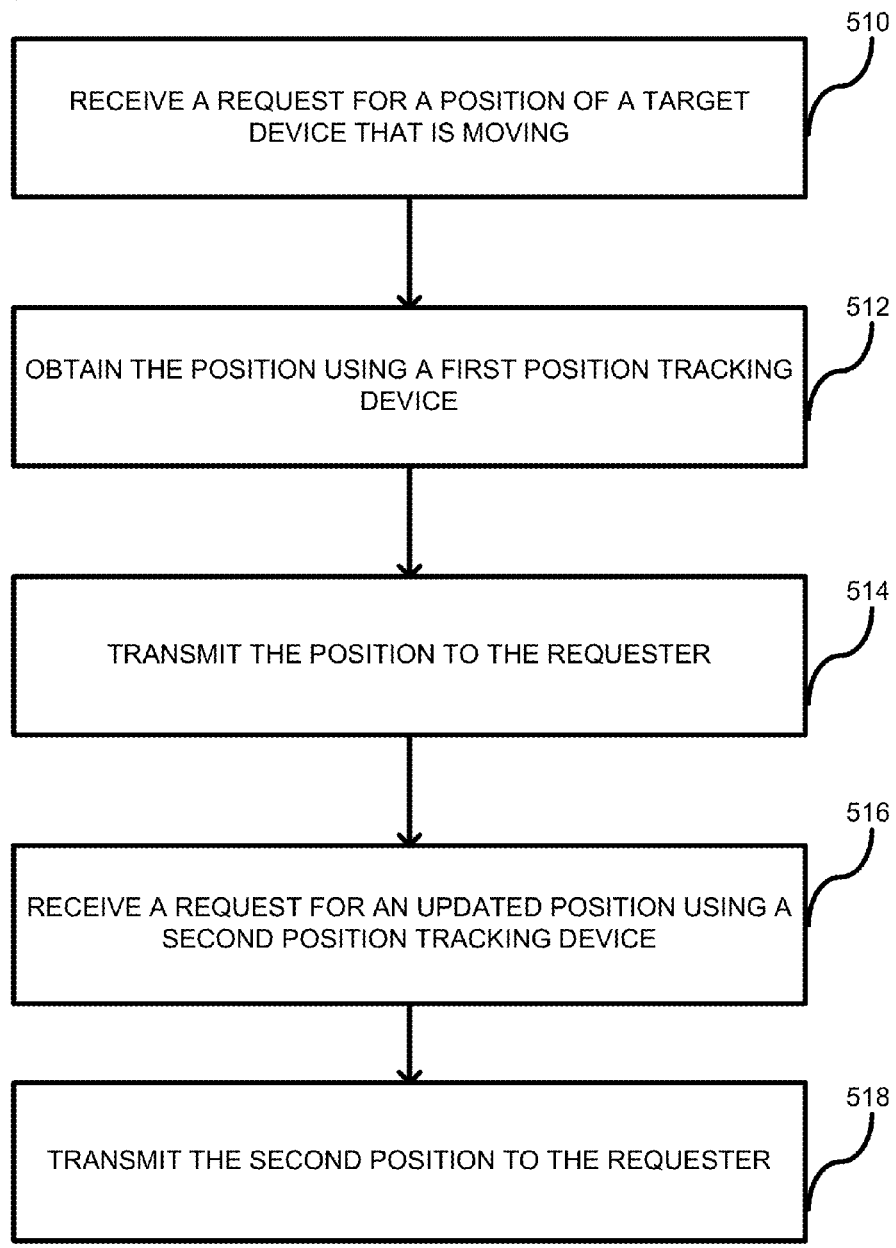
FIG. 5 is a flowchart of another embodiment that can be used to navigate to a target device.

FIG. 5 is a flowchart of a method that can be used to navigate a source device to a target device from the perspective of the target device. In process block 510, a request can be received at the target device from a server computer or directly from a source device for a position of the target device, which is in motion. In process block 512, the target device can obtain its position using a first position tracking device, such as those already described. In process block 514, the position can be transmitted to the requester. In process block 516, the target device can receive a request for an updated position using a second position tracking device, different than the first position tracking device. Thus, the target device can switch the position tracking devices used in response to the request. In process block 518, the second position can be transmitted to the requester using the second position tracking device.

Figure 6:
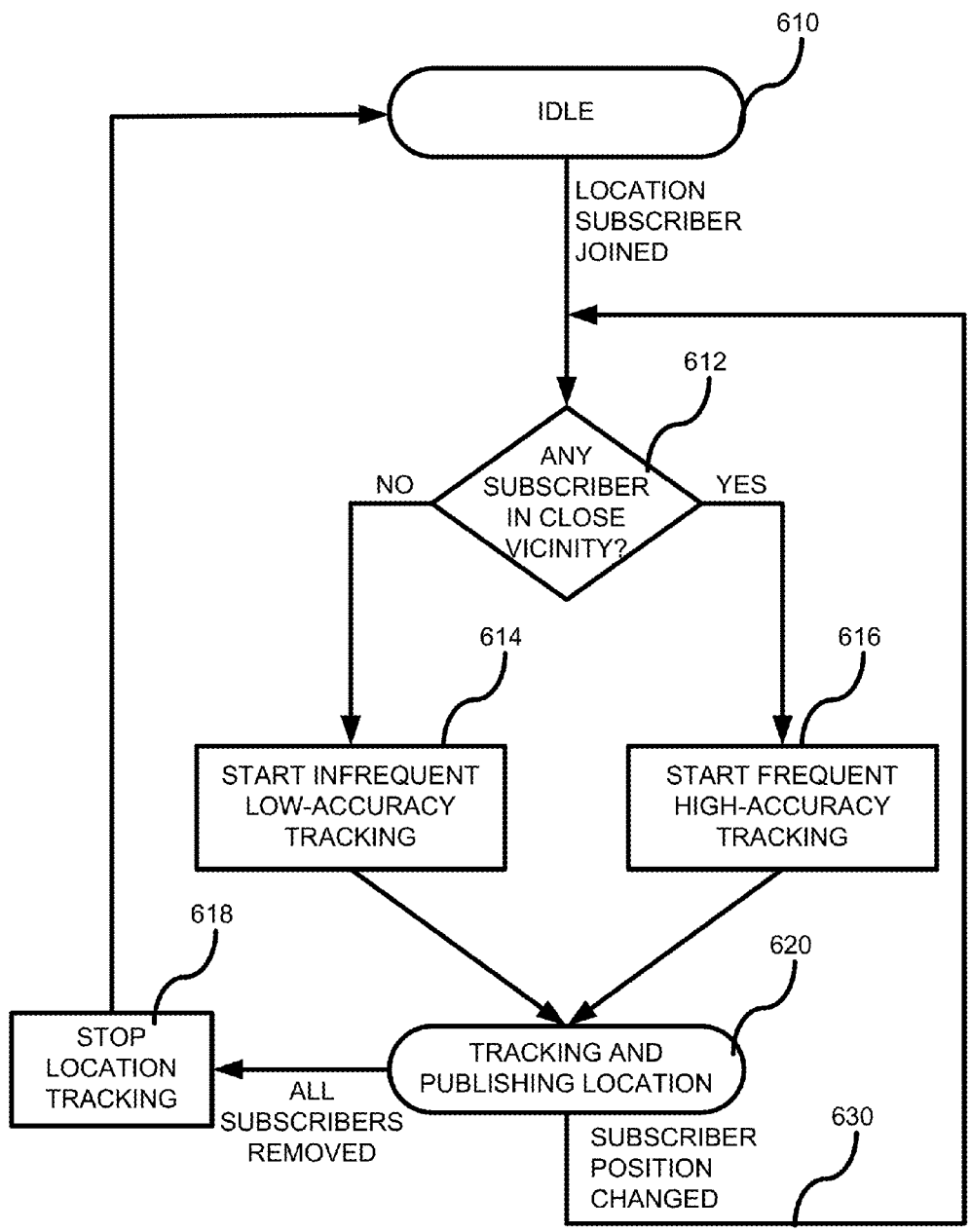
FIG. 6 is a flowchart of another embodiment wherein tracking switches between low-accuracy and high-accuracy position devices.

FIG. 6 is a flowchart of a method for navigating between a source device and a target device. In process block 610, the flow on a target device can begin from an idle state once initiated from a source device. In decision block 612, a check can be made whether a source device is within a threshold distance (e.g., 1 mile) from a target device. If not, then in process block 614, the target device can use a low-accuracy tracking that is updated infrequently (e.g., periodic time intervals of 1 minute or more). If decision block 612 is answered in the affirmative, then in process block 616, a high-accuracy tracking can be performed that tracks position frequently (e.g., periodic time intervals of less than 1 minute). In process block 620, the position information can be published so that an updated route between the source device and the target device can be computed and made available to the source device. If the subscriber or source device changes position, then the flow continues as shown by arrow 630. Thus, if the target device was tracking low-accuracy position at any point in time and the two devices come relatively close to each other, the target device switches to high-accuracy position tracking to facilitate more accurate navigation on the source device. Conversely, if the target device was tracking high-accuracy position at any point in time and the two devices move away from each other for any reason whatsoever, the target device switches to low-accuracy position tracking to conserve power. When all the source devices are done, the location tracking is terminated in process block 618 and the flow returns to the idle state 610. Thus, it should be appreciated that two or more source devices can be tracking towards the target device.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, .NET, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of navigating to a moving client device, comprising:
    receiving a position of a target device that is itself moving;
    displaying, on a source device, the position of the target device on a map together with a first route from the source device to the target device; and
    while the source device is moving towards the target device, displaying on the source device, an updated second route, different than the first route, from the source device to the target device;
    further including obtaining the position of the target device using a low-power, low-accuracy, first position tracking device, and switching to a second higher power, and higher accuracy second position tracking device when the source device is within a predetermined distance from the target client device.

2. The method of claim 1, wherein the low-power first position tracking device uses cellular towers or WiFi access points for tracking and the higher-power second position tracking device uses GPS position tracking.

3. The method of claim 1, further including providing a server computer in communication with the source device and target device that recalculates the route when the source device moves more than a threshold distance from when the first route was calculated.

4. The method of claim 1, wherein the source device and target device are mobile phones.

5. The method of claim 1, further including switching, in the target device, between position tracking devices depending on a distance between the source and target devices.

6. The method of claim 1, further including providing a server computer in communication with the source device and target device, and transmitting to the server computer an identification of the target device to be tracked.

7. The method of claim 6, further including:
    in response to receiving the identification, transmitting to the target device, a command to begin tracking;

receiving from the target device a current position of the target device obtained using cellular or WiFi positioning systems; and transmitting to the source device the current position of the target and the first route to the target.

8. The method of claim 1, wherein the first and second routes are calculated on the source device.

9. The method of claim 1, further including transmitting, to the target device, a command to switch from a low accuracy position tracking device to a high accuracy position tracking device and optionally providing more frequent updates of the changing position of the target device.

10. The method of claim 1, further including transmitting to the target device, a request for an identification of the target device, receiving the identification, and transmitting the identification to a server used to track the target device.

11. One or more computer readable storage media storing instructions thereon for executing a method, the method comprising:

receiving, in a target device, a request for a first position using a first position tracking device;

obtaining the first position of the target device using the first position tracking device, which is low accuracy;

transmitting the first position to the requester;

receiving, in the target device, a request for an updated second position using a second position tracking device, different than the first position tracking device, wherein the second position tracking device is higher accuracy than the low accuracy, first position tracking device; and transmitting the second position to the requester.

12. The method of claim 11, further including:

receiving the first position of the target device and calculating a route from a source device to the target device; and receiving the second position of the target device and recalculating the route from the source device to the target device.

13. The method of claim 11, wherein the target device is a mobile phone and the first position tracking device uses cellular towers or WiFi access points for position tracking and the second position tracking device uses GPS.

14. The method of claim 11, further including a server computer coupled to the target device that transmits the first position and second position to a source device that uses the first and second positions for displaying a map location of the target device.

15. A system for navigating from a source mobile phone to a target mobile phone, wherein both the source mobile phone and target mobile phone are moving during the navigation, the system comprising:

a server computer for receiving position information of a target mobile phone and transmitting the position information to a source mobile phone, the server computer for calculating a route from the source mobile phone to the target mobile phone multiple times while the source mobile phone is navigating to the target mobile phone with both the source and target mobile phones in motion, wherein the target mobile phone switches from a first position tracking circuit that is low accuracy to a second position tracking circuit that is higher accuracy when the source and target mobile phones are within a predetermined distance apart.

16. The system of claim 15, wherein application software on the target mobile phone switches between the different position tracking circuits based on commands from the server computer.

17. The system of claim 16, wherein the at least two different position tracking circuits include circuitry for using at least two of the following: GPS location technology, cellular tower location technology, or WiFi-based positioning system.

18. The system of claim 16, wherein the server computer transmits a command to the target mobile phone to switch which position tracking circuit is used if the source mobile phone is within a predetermined distance to the target mobile phone.

19. The system of claim 18, wherein the target mobile phone switches from using cellular tower location tracking to GPS upon receipt of the command to switch.

* * * * *